United States Patent [19]

Shenoy

[11] Patent Number: 5,137,427
[45] Date of Patent: Aug. 11, 1992

[54] QUIET TAIL ROTOR

[75] Inventor: Rajarama K. Shenoy, Shelton, Conn.

[73] Assignee: United Technologies Corporation, Hartford, Conn.

[21] Appl. No.: 630,692

[22] Filed: Dec. 20, 1990

[51] Int. Cl.⁵ .............................................. B63H 1/26
[52] U.S. Cl. ................................. 416/223 R; 416/228; 416/238; 416/DIG. 2; 416/DIG. 5
[58] Field of Search ............. 416/223 R, 228, DIG. 2, 416/DIG. 5, 238

[56] References Cited

U.S. PATENT DOCUMENTS

| | | | |
|---|---|---|---|
| 3,721,507 | 3/1973 | Monteleone | 416/223 R |
| 4,012,172 | 3/1977 | Schwaar et al. | 416/228 |
| 4,142,837 | 3/1979 | de Simone | 416/223 R |
| 4,569,633 | 2/1986 | Flemming, Jr. | 416/DIG. 2 |
| 4,880,355 | 11/1989 | Vuillet et al. | 416/228 |
| 5,035,577 | 7/1991 | Damongeot | 416/228 |

FOREIGN PATENT DOCUMENTS 2067493  7/1981  United Kingdom ................ 416/228

*Primary Examiner*—Thomas E. Denion
*Attorney, Agent, or Firm*—Terrance J. Radke

[57] ABSTRACT

A quiet tail rotor (QTR) blade for helicopters that provides reduced noise levels and increased thrust efficiency. The QTR blade includes a first segment for connecting the QTR blade to a helicopter tail rotor hub and an outboard segment, integral with the first segment, having a configuration that reduces high speed impulsive noise and blade vortex interaction noise and provides increased thrust efficiency. The outboard segment includes an inboard segment integral with the first segment and a swept, tapered tip segment integral with the inboard segment. The inboard segment has a constant chord and a predetermined constant airfoil section profile defined by constant upper and lower surface contours. The predetermined constant airfoil section profile has a t/c ratio greater than about twelve percent of the chord at any station. The swept, tapered tip segment has a variable chord and a predetermined airfoil section profile defined by constant upper and lower surface contours. The predetermined airfoil section profiled has a t/c ratio less than about nine percent of the chord at any station. The swept, tapered tip segment includes a rearwardly swept, straight leading edge having a sweep angle in the range of about 30° to about 45°, and preferably about 45°.

8 Claims, 3 Drawing Sheets

QUIET TAIL ROTOR

TECHNICAL FIELD

This invention relates to helicopter tail rotors, and more particularly to a tail rotor blade configuration that provides reduced noise levels and increased thrust generation during operation.

BACKGROUND OF THE INVENTION

For conventional helicopters, the tail rotor assembly plays an important part in the aerodynamic operation of the helicopter. The thrust (lift) generated by the tail rotor blades provides the torque to counterbalance the torque effect transmitted to the helicopter fuselage by the main rotor blades. Due to the higher rotational speeds existing outwardly along the outboard segment of the tail rotor blades, the outboard segments of the tail rotor blades provide the major portion of the thrust generated by the tail rotor assembly. This characteristic of tail rotor blades having a rectangular planform is graphically illustrated in FIG. 1 wherein the radius ratio, r/R, defines specific stations along a blade having a total span equal to R. An examination of the lift profile L of FIG. 1 shows that the lift distribution increases to a maximum at about the 0.9 station, and then falls off precipitously.

The inefficient loading distribution existing across the tip section of the outboard blade section, i.e., the lift profile from about the 0.9 station to the 1.0 station, is due primarily to the vortices generated by the tail rotor blades, especially the vortices developed by the tip segments of the tail rotor blades. The three dimensional air flow effects near the tip of the tail rotor blade cause the rapid dropoff outboard of the 0.92 station, as illustrated in FIG. 1. The tip vortices are concentrated vortices that are shed by the lift generating tail rotor blades, the center of each tip vortex intersecting the corresponding trailing tail rotor blade at about the 0.92 station. Just inboard of this station, the interaction of the vortex induces large inflow, and hence, the blade segments in this region, unless designed properly, can stall.

The tail rotor assembly generally provides the major contribution to the noise level of operating helicopters. Of the noise generated by the tail rotor blades, noise arising from blade vortex interaction is significant source of helicopter operating noise. Blade vortex interaction noise arises primarily from interfering tip vortices interacting with the corresponding trailing tail rotor blades. Equally significant in addition to blade vortex interaction noise is high speed impulsive noise generated by the tail rotor blades due to the onset of compressibility effects at the tip segments of the tail rotor blades. The main rotor blades of a helicopter also generate vortices which interact with the tail rotor blades to generate noise.

A need exists to reduce the noise levels resulting from blade vortex interaction and compressibility effects. Preferably, the means utilized to reduce tail rotor blade noise levels does not degrade the thrust efficiency of the tail rotor assembly, i.e., does not require increased power input to maintain the necessary tail rotor assembly thrust.

DISCLOSURE OF THE INVENTION

One object of the present invention is to provide a tail rotor blade having a planform that provides reduced noise levels, and especially noise generated by the onset of compressibility effects and blade vortex interaction due to tip vortices interacting with trailing tail rotor blades.

Another object of the present invention is to provide a tail rotor blade having a airfoil configuration that provides increased thrust (lift) efficiency.

These and other objects are provided by the quiet tail rotor (QTR) blade according to the present invention that includes a first segment that is operative to attach the QTR blade to the tail rotor hub, to transmit pitch control movements from a control system to the QTR blade, to transmit blade aerodynamic pitching moments back to the control system, and to transfer centrifugal and bending loads to the spar of the QTR blade and an outboard segment, integral with the first segment, that has a configuration that reduces blade vortex interaction noise and provides increased thrust efficiency. The outboard segment of the QTR blade includes an inboard segment integral with and extending outwardly from the first segment and a swept, tapered tip segment integral with the inboard segment.

The sweep configuration of the swept, tapered tip segment reduces the intensity of the generated tip vortex, and causes the generated tip vortex to be displaced such that the interference effect of the generated tip vortex on the trailing tail rotor blade is reduced, thereby resulting in a reduction in blade vortex interaction noise. Moreover, the sweep of the tip segment delays the onset of compressibility effects due to the reduced magnitude of tangential component of the tip segment velocity vector. A major portion of the inboard segment has a predetermined constant airfoil cross section wherein the thickness of any airfoil section is greater than about 12 percent of the chord of such airfoil section, thereby providing an inboard segment with improved thrust generating capability.

The swept, tapered tip segment has a gradually decreasing chord and a SSC-A09 airfoil cross section defined by constant upper and lower surface contours. The SSC-A09 airfoil of the swept, tapered tip segment has a t/c ratio less than about 9 percent of the chord. The swept, tapered tip segment includes a first arcuate portion, a rearwardly swept, straight leading edge, a second arcuate portion, and a tip chord. The sweep angle of the rearwardly swept, straight leading edge may be in the range of about 30° to about 45°, and preferably is about 45°.

The inboard segment has a constant chord and includes a constant VR-7 airfoil cross section defined by constant upper and lower surface contours. The VR-7 airfoil portion of the inboard segment has a t/c ratio greater than about 12 percent of the chord at any station. The constant VR-7 airfoil provides a high lift coefficient such that the constant VR-7 airfoil provides a significant portion of the thrust developed by the QTR blade.

The foregoing and other features and advantages of the present invention will become more apparent from the following description and accompanying drawings.

BEST MODE FOR CARRYING OUT THE INVENTION

Figure 1:
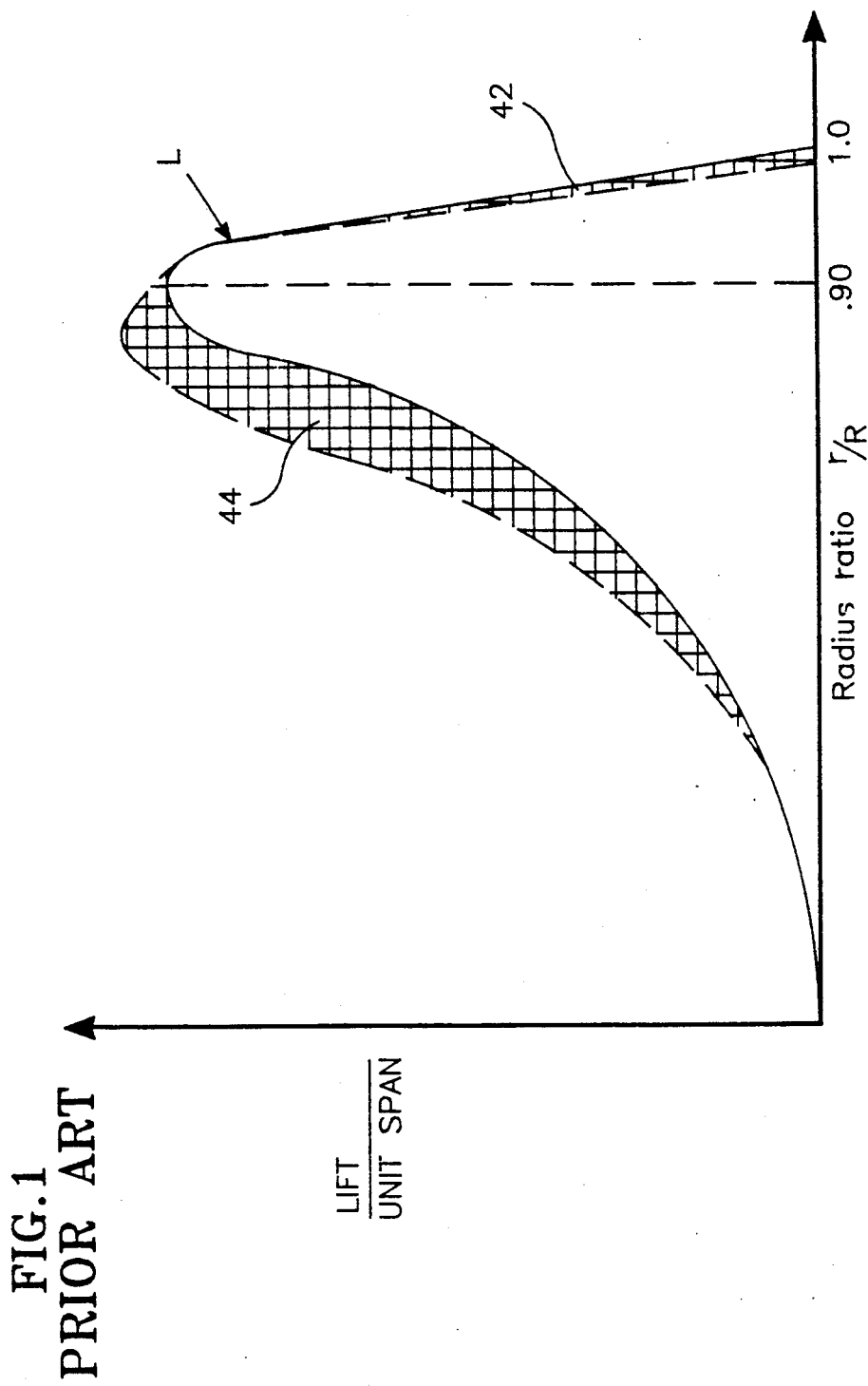
FIG. 1 is a diagram illustrating the lift profile along the span of a tail rotor blade.
Figure 2:
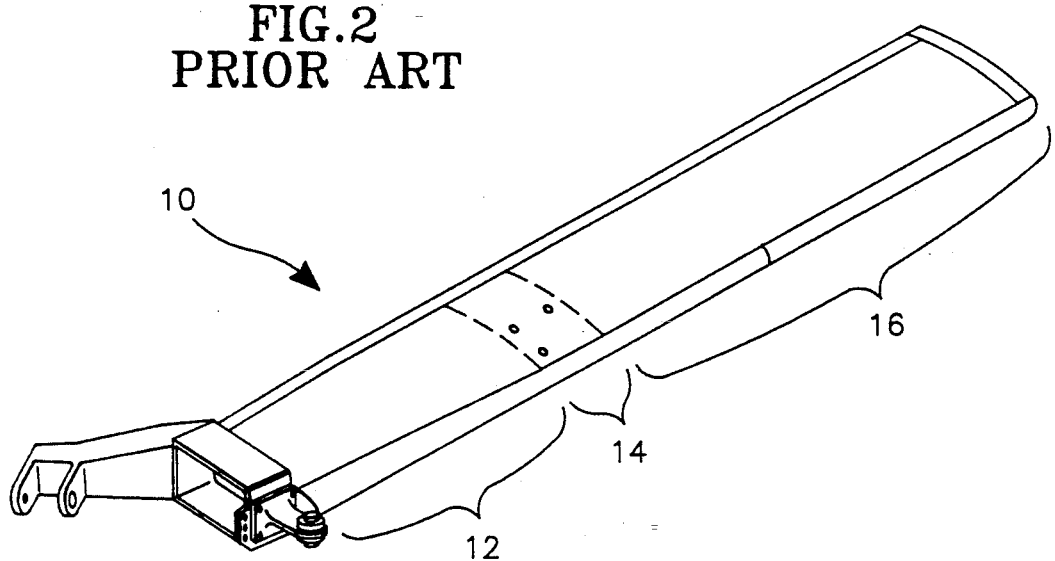
FIG. 2 is a perspective illustration of a conventional crossbeam helicopter tail rotor blade.

Referring to the drawings wherein like reference numerals identify corresponding or similar elements throughout the several views, FIG. 2 illustrates the basic configuration of a conventional helicopter crossbeam tail rotor blade 10 having a rectangular planform. The structure of the tail rotor blade 10 includes three primary segments: a torque tube segment 12, a spar attachment segment 14, and an outboard segment 16. The torque tube segment 12 is a torsionally rigid segment for transmitting pitch control movements from the control system (not shown) to the tail rotor blade 10 and for transmitting blade aerodynamic pitching moments back to the control system. The spar attachment segment 12 is designed to transfer centrifugal and bending loads to the spar (not shown), which is the primary internal structural member of the tail rotor blade 10. The outboard segment 16 provides the major portion of the thrust (lift) developed by the tail rotor blade 10, as shown in FIG. 1.

Figure 3:
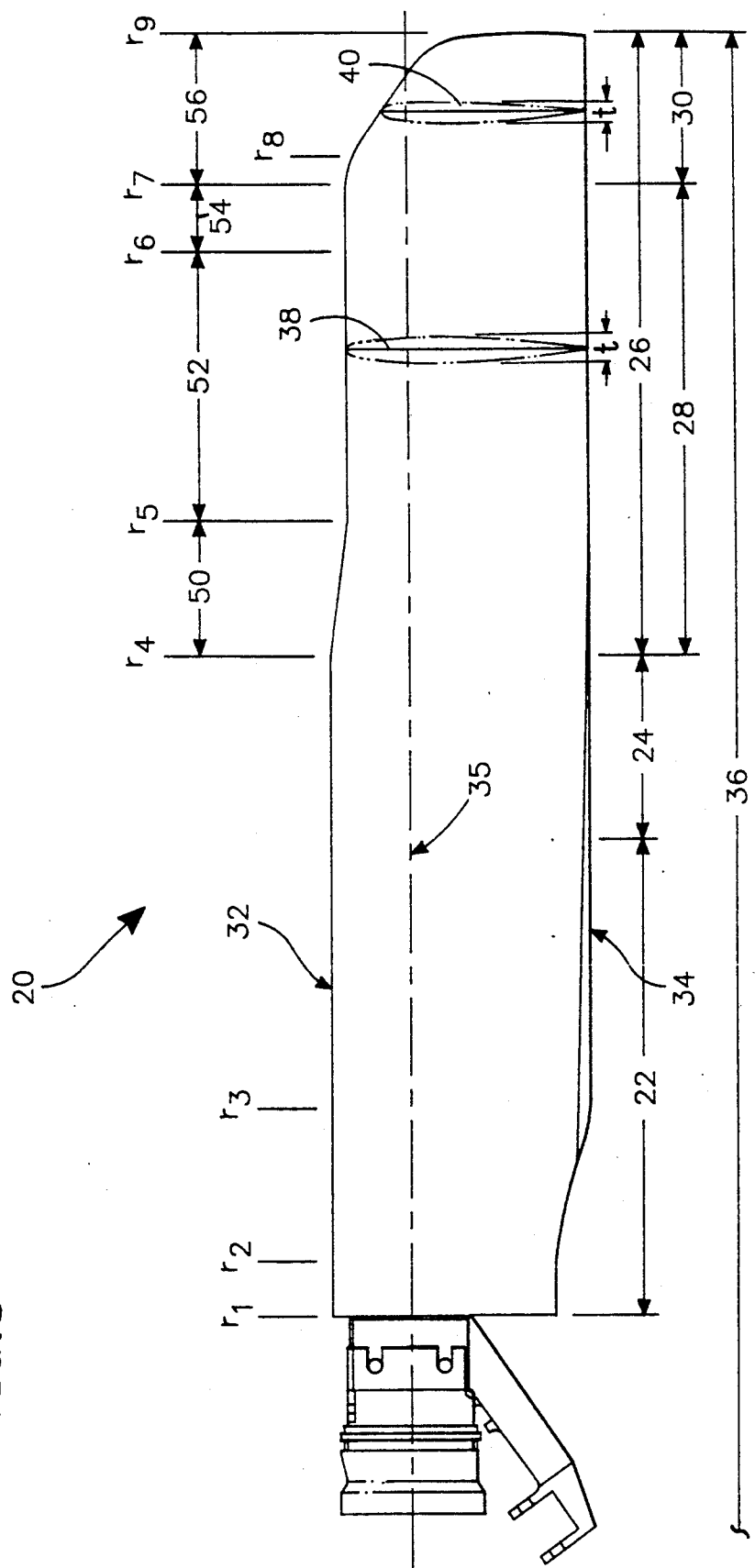
FIG. 3 illustrates one embodiment of a planform of the quiet tail rotor blade according to the present invention.

One embodiment of a quiet tail rotor (QTR) blade 20 according to the present invention has a planform as exemplarily illustrated in FIG. 3. The QTR blade 20 is configured for attachment to and rotation about a tail rotor hub (not shown). A plurality of QTR blades 20 comprise the tail rotor assembly for a helicopter.

The structural configuration of the QTR blade 20 includes a torque tube segment 22, a spar attachment segment 24, and an outboard segment 26. In accordance with the present invention, the outboard segment 26 is further defined as including an inboard segment 28 integral with and extending outwardly from the spar attachment segment 24, and a swept, tapered tip segment 30. The QTR blade 20 has a leading edge 32, a trailing edge 34, and a feathering axis 35 that extends through the central axis of the tail rotor hub (not shown). Per conventional nomenclature, the QTR blade 20 has a blade span 36 measured from the central axis of the tail rotor hub (not shown) to the tip segment 30. Specific stations along the blade span 36, identified by reference elements $r_i$, where i=1, 2, etc., are expressed as percentages of the blade span 36. The QTR blade 20 has an overall airfoil configuration that provides an increased thrust efficiency. Any given airfoil section of the inboard segment 28 has a constant chord 38, and any given airfoil section of the tip segment 30 has a variable chord 40.

The sweep of the tip segment 30 reduces the planform area of the tip segment 30 of the QTR blade 20 by about 20 percent as compared with a conventional tail rotor blade having a rectangular planform of equivalent gross dimensions (equivalent tip span; constant chord). The swept, tapered tip segment 30 has a predetermined airfoil cross-sectional profile defined by constant upper and lower surface contours over the span of the tip segment 30. The thickness of any airfoil section of the swept, tapered tip segment 30 is less than about 9 percent of the chord 40 of such airfoil section, i.e., $t/c < 0.09$.

The sweep configuration of the swept, tapered tip segment 30 reduces the intensity of the generated tip vortex, and causes the generated tip vortex to be displaced such that the interference effect of the generated tip vortex on the corresponding trailing tail rotor blade is reduced. This results in a reduction in blade vortex interaction noise. In addition, the sweep configuration of the tip segment 30 provides a tangential component o the tip segment 30 velocity vector of reduced magnitude, which delays the onset of compressibility effects at the tip segment 30. This results in a reduction in high speed impulsive noise. The configuration of the swept, tapered tip segment 30 allows the QTR blade 20 to be operated at higher rotational speeds before reaching critical Mach numbers.

The swept, tapered tip segment 30 has an airfoil configuration of gradually reduced chord 40, which results in reduced thrust being generated by the swept, tapered tip segment 30. The loss of thrust resulting from the configuration of the swept, tapered tip segment 30 according to the present invention is illustrated by the hatched area 42 in FIG. 1. To compensate for the loss of thrust efficiency resulting from the swept, tapered tip segment 30, a major portion of the inboard segment 28 of the QTR blade 20 is configured with a predetermined constant airfoil cross-sectional profile defined by constant upper and lower surface contours. The thickness of any airfoil section of the major portion of the inboard segment 28 is greater than about 12 percent of the chord of such airfoil section, i.e., $t/c > 0.12$.

Such an airfoil configuration for the inboard segment 28 is contrary to accepted design practice since the acoustic performance of a rotor blade generally decreases with an increase in the t/c ratio, i.e., the noise level increases. However, an airfoil having a greater t/c ratio generally provides an improved thrust capability. The configuration of the inboard segment 28 of the QTR blade 20 according to the present invention provides a high $C_{Lmax}$ that not only compensates for the loss of thrust efficiency due to the swept, tapered tip segment 30, but actually results in a QTR blade 20 that has an overall increase in thrust efficiency. The increase in thrust as a result of the improved $CL_{max}$ is depicted in FIG. 1 by the crosshatched area 44.

Several pertinent stations, $r_1$-$r_7$, relating to the airfoil configuration of the QTR blade 20 according to the present invention are identified in FIG. 3. Station $r_1$ identifies the root end of the QTR blade 20, station $r_2$ identifies a torque tube transition point, and station $r_3$ identifies the termination point of the torque tube transition span. Between stations $r_2$ and $r_3$, the QTR blade 20 transitions to the full chord 38. The QTR blade 20 has a constant chord 38 from station $r_3$ through station $r_7$. From station $r_3$ to station $r_4$, the start of the outboard segment 26, the QTR blade 20 is an airfoil having symmetrical cross sections and linear t/c taper.

A first airfoil transition span 50 exists between stations $r_4$ and $r_5$. The QTR blade 20 transitions from the linear t/c taper airfoil section at station r to a VR-7 airfoil cross section at station $r_5$ (The VR-7 airfoil was developed by the Boeing-Vertol Co.). Simultaneously, the leading edge 34 experiences a very small displacement (about 6% of the magnitude of the chord 38) towards the feathering axis 35 across the first airfoil transition span 50.

The QTR blade 20 has a constant VR-7 airfoil cross section over the first airfoil section 52, i.e., between stations $r_5$ and $r_6$. The VR-7 airfoil has upper and lower surface contours as described in Table I wherein X defines a station, measured from the leading edge 32, along the chord 38 (C; $Y_u$ is the vertical distance to the upper airfoil surface, measured from the chord (C), at station X, and $Y_l$ is the vertical distance to the lower airfoil surface, measured from the chord (C), at station X. The constant cross section VR-7 airfoil of the first airfoil section 52 provides a high lift coefficient such that the first airfoil section 52 provides a significant portion of the thrust developed by the QTR blade 20.

TABLE I

| X/C | $Y_u$/C | $Y_l$/C |
|---|---|---|
| 0.005 | 0.0165 | −0.00575 |
| 0.01 | 0.0218 | −0.0081 |
| 0.02 | 0.0298 | −0.0109 |
| 0.03 | 0.03615 | −0.0129 |
| 0.04 | 0.0415 | −0.01445 |
| 0.05 | 0.04605 | −0.01585 |
| 0.06 | 0.05025 | −0.01710 |
| 0.07 | 0.0541 | −0.01805 |
| 0.085 | 0.0593 | −0.01985 |
| 0.102 | 0.0645 | −0.02145 |
| 0.12 | 0.0691 | −0.02285 |
| 0.14 | 0.0737 | −0.0241 |
| 0.16 | 0.0775 | −0.0251 |
| 0.18 | 0.0808 | −0.0260 |
| 0.20 | 0.0838 | −0.0266 |
| 0.225 | 0.0867 | −0.0273 |
| 0.255 | 0.0892 | −0.0280 |
| 0.29 | 0.0909 | −0.0285 |
| 0.33 | 0.0914 | −0.0289 |
| 0.37 | 0.0905 | −0.0290 |
| 0.41 | 0.0887 | −0.0285 |
| 0.45 | 0.0856 | −0.0275 |
| 0.49 | 0.0816 | −0.0260 |
| 0.53 | 0.0767 | −0.0240 |
| 0.57 | 0.0710 | −0.0220 |
| 0.61 | 0.0646 | −0.0199 |
| 0.65 | 0.0580 | −0.0179 |
| 0.69 | 0.0514 | −0.0158 |
| 0.73 | 0.0447 | −0.0138 |
| 0.77 | 0.0381 | −0.0117 |
| 0.81 | 0.0315 | −0.0097 |
| 0.845 | 0.0257 | −0.00791 |
| 0.88 | 0.0199 | −0.00613 |
| 0.91 | 0.0149 | −0.00459 |
| 0.935 | 0.01078 | −0.00332 |
| 0.955 | 0.00745 | −0.00230 |
| 0.98 | 0.00331 | −0.00102 |
| 1.0 | 0.0000 | 0.0000 |

A second airfoil transition span 54 exists between stations $r_6$ and $r_7$. The QTR blade 20 transitions from the constant VR-7 airfoil cross section at station $r_6$ to a SSC-A09 airfoil cross section at station $r_7$ (The SSC-A09 airfoil was developed by Sikorsky Aircraft.). The QTR blade 20 has a SSC-A09 airfoil cross section over the second airfoil section 56, i.e., the swept, tapered tip segment 30, between stations $r_7$ and $r_9$. The SSC-A09 airfoil has upper and lower surface contours as described in Table II. The SSC-A09 airfoil has a t/c ratio less than about 9% of the chord 40, which reduces high speed impulsive noise and blade vortex interaction noise generated by the QTR blade 20. Station $r_8$ defines a radial distance, measure from the tail rotor hub, equal to about 0.92 of the blade span 36.

Figure 4:
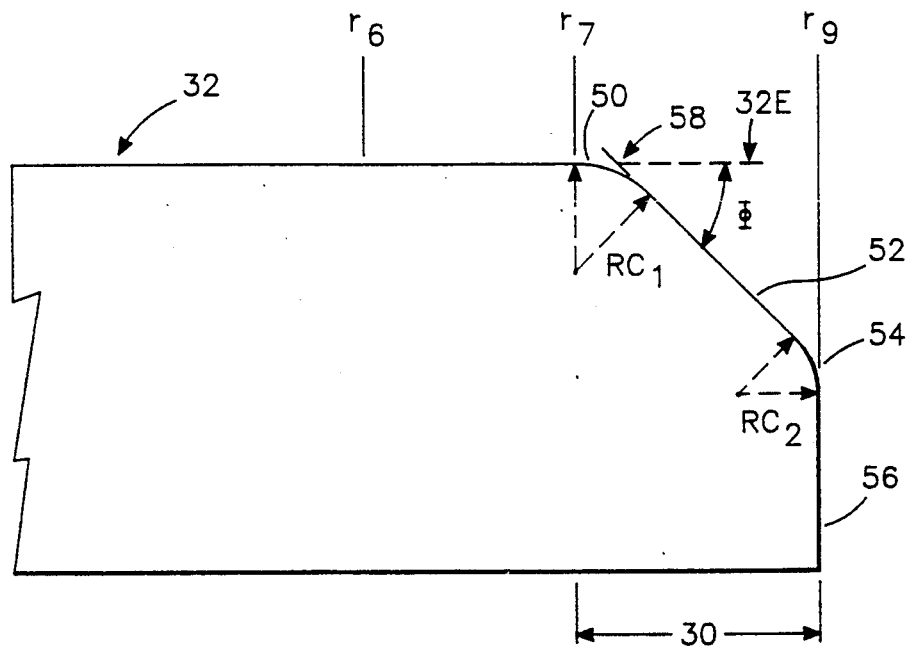
FIG. 4 is a partial, enlarged view of the configuration of the swept, tapered tip segment of the quiet tail rotor blade of FIG. 3.

An enlarged view of the swept, tapered tip segment 30 is illustrated in FIG. 4. The swept, tapered tip segment 30 includes a first arcuate portion 60, a rearwardly swept, straight leading edge 62, a second arcuate portion 64, and a tip chord 66. Station $r_7$ defines the beginning of the swept, tapered tip segment 30. Station $r_7$ may be located within the range of stations between about 0.88 to about 0.92 of the blade span 36. Preferably, station r is located at about the 0.90 station, as illustrated in FIG. 4.

The radius of curvature, $RC_1$, of the first arcuate portion 60 is of such magnitude that the first arcuate portion 60 presents a smoothly curved transition surface between the leading edge at station $r_7$ and the rearwardly swept, straight leading edge 62. The rearwardly swept, straight leading edge 62 is swept rearwardly through an angle $\phi$ with respect to an extension $32_E$ of the leading edge 32 of the inboard segment 28. The sweep angle $\phi$ may be in the range of about 30° to about 45°, depending upon the aspect ratio of the QTR blade 20. Preferably the sweep angle $\phi$ is equal to about 45°. An intersect point 58 may be defined by the extension $32_E$ of the leading edge 32 and an extension of the rearwardly swept, straight leading edge 62, as shown in FIG. 4. Preferably, the intersect point 58 should be not located inboard of station 0.92.

The radius of curvature, $RC_2$, of the second arcuate portion 64 is of such magnitude that the second arcuate portion 64 presents a smoothly curved transition surface between the rearwardly swept, straight leading edge 62 and the tip chord 66. The length of the tip chord 66 should be such that the Reynolds number at the tip chord 66 is more than the critical Reynolds number. This helps prevent separation at the swept, tapered tip segment 30, and reduces broadband noise generated by the swept, tapered tip segment 30.

TABLE II

| X/C | $Y_u$/C | $Y_l$/C |
|---|---|---|
| 0.0000000 | 0.0000000 | 0.0000000 |
| 0.0001990 | 0.0020004 | −0.0014536 |
| 0.0007980 | 0.0039456 | −0.0028691 |
| 0.0019940 | 0.0064817 | −0.0045726 |
| 0.0029910 | 0.0080286 | −0.0054464 |
| 0.0044866 | 0.0098685 | −0.0064445 |
| 0.0069791 | 0.0123915 | −0.0077026 |
| 0.0099701 | 0.0149206 | −0.0088773 |
| 0.0159522 | 0.0190758 | −0.0107041 |
| 0.0219343 | 0.0224997 | −0.0121748 |
| 0.0279164 | 0.0254451 | −0.0134469 |
| 0.0338985 | 0.0280394 | −0.0145875 |
| 0.0398806 | 0.0303688 | −0.0156308 |
| 0.0458627 | 0.0324936 | −0.0165939 |
| 0.0518448 | 0.0344488 | −0.0174868 |
| 0.0578269 | 0.0362486 | −0.0183144 |
| 0.0677969 | 0.0389031 | −0.0195684 |
| 0.0777671 | 0.0411432 | −0.0206910 |
| 0.0877373 | 0.0430162 | −0.0217062 |
| 0.0977075 | 0.0445832 | −0.0226382 |
| 0.1126626 | 0.0465043 | −0.0239102 |
| 0.1276179 | 0.0480542 | −0.0250639 |
| 0.1425731 | 0.0493453 | −0.0261243 |
| 0.1575294 | 0.0504438 | −0.0271044 |
| 0.1724845 | 0.0513848 | −0.0280133 |
| 0.1874397 | 0.0521844 | −0.0288530 |
| 0.2023950 | 0.0528595 | −0.0296285 |
| 0.2173502 | 0.0534273 | −0.0303387 |
| 0.2323054 | 0.0539109 | −0.0309878 |
| 0.2472606 | 0.0543222 | −0.0315787 |
| 0.2771711 | 0.0549582 | −0.0325939 |
| 0.3070815 | 0.0553685 | −0.0334015 |
| 0.3369920 | 0.0555642 | −0.0340074 |
| 0.3768725 | 0.0554939 | −0.0345060 |
| 0.4167542 | 0.0550395 | −0.0346375 |
| 0.4366944 | 0.0546633 | −0.0345582 |
| 0.4566347 | 0.0541818 | −0.0343756 |
| 0.4765750 | 0.0535949 | −0.0340867 |
| 0.4965153 | 0.0528987 | −0.0336834 |
| 0.5164557 | 0.0520931 | −0.0331648 |
| 0.5363959 | 0.0511762 | −0.0325317 |
| 0.5563362 | 0.0501489 | −0.0317904 |
| 0.5762765 | 0.0490093 | −0.0309487 |
| 0.5962168 | 0.0477553 | −0.0300177 |
| 0.6161571 | 0.0463809 | −0.0290025 |
| 0.6360974 | 0.0448751 | −0.0279040 |

TABLE II-continued

| X/C | $Y_u/C$ | $Y_l/C$ |
|---|---|---|
| 0.6560386 | 0.0432198 | −0.0267202 |
| 0.6759790 | 0.0413910 | −0.0254481 |
| 0.6959193 | 0.0393675 | −0.0240878 |
| 0.7158596 | 0.0371404 | −0.0226422 |
| 0.7357998 | 0.0347187 | −0.0211213 |
| 0.7557402 | 0.0321385 | −0.0195403 |
| 0.7756805 | 0.0294449 | −0.0179181 |
| 0.7956207 | 0.0266811 | −0.0162719 |
| 0.8155611 | 0.0238711 | −0.0146166 |
| 0.8355014 | 0.0210120 | −0.0129573 |
| 0.8554416 | 0.0180887 | −0.0112890 |
| 0.8753819 | 0.0150931 | −0.0095976 |
| 0.8953232 | 0.0120514 | −0.0078631 |
| 0.9152635 | 0.0090458 | −0.0060814 |
| 0.9352039 | 0.0062289 | −0.0042897 |
| 0.9551441 | 0.0038493 | −0.0026103 |
| 0.9600000 | 0.0033756 | −0.0022631 |
| 0.9633512 | 0.0030800 | −0.0020583 |
| 0.969000 | 0.0026478 | −0.0017742 |
| 0.9750842 | 0.0022883 | −0.0015480 |
| 0.9800690 | 0.0022035 | −0.0014189 |
| 0.9850545 | 0.0022152 | −0.0013367 |
| 1.0000000 | 0.0024077 | −0.0011590 |

Optionally, the trailing edge 34 of the QTR blade 20 may be swept forward, in addition to the rearward sweep of the leading edge 32 as discussed in the preceding paragraphs. The same criteria as discussed in the preceding paragraphs apply to an embodiment of the QTR blade 20 having a swept, tapered tip segment 30 that includes a forwardly swept trailing edge 34.

Although this invention has been shown and described with respect to detailed embodiments thereof, it will be understood by those skilled in the art that various changes in form and detail thereof may be made without departing from the spirit and scope of the claimed invention.

What is claimed is:

1. A quiet tail rotor blade for helicopters that provides reduced noise levels and increased thrust efficiency, comprising:
   a first segment adapted for connecting said quiet tail rotor to a helicopter tail rotor hub; and
   an outboard segment integral with and extending outwardly from said first segment, said outboard segment including an inboard segment integral with and extending outwardly from said first segment and a swept, tapered tip segment integral with and extending outwardly from said inboard segment,
   said inboard segment having a constant chord and a predetermined constant airfoil section profile defined by constant upper and lower surface contours, each airfoil section having a thickness greater than about twelve percent of said constant chord,
   said swept, tapered tip segment having a variable chord and a predetermined airfoil section profile defined by constant upper and lower surface contours, each airfoil section having a thickness less than about nine percent of said corresponding variable chord of said airfoil section,
   said swept tapered tip segment including a rearwardly swept, straight leading edge having a predetermined sweep angle within a range of about 30° to about 45°.

2. The quiet tail rotor of claim 1 wherein said predetermined sweep angle of said rearwardly swept, straight leading edge is about 45°.

3. The quiet tail rotor blade of claim 1 wherein said predetermined constant airfoil section profile of said inboard segment is defined by values of X/C, $Y_{u/C}$, and Yl/C as follows:

| X/C | $Y_u/C$ | $Y_l/C$ |
|---|---|---|
| 0.005 | 0.0165 | −0.00575 |
| 0.01 | 0.0218 | −0.0081 |
| 0.02 | 0.0298 | −0.0109 |
| 0.03 | 0.03615 | −0.0129 |
| 0.04 | 0.0415 | −0.01445 |
| 0.05 | 0.04605 | −0.01585 |
| 0.06 | 0.05025 | −0.01710 |
| 0.07 | 0.0541 | −0.01805 |
| 0.085 | 0.0593 | −0.01985 |
| 0.102 | 0.0645 | −0.02145 |
| 0.12 | 0.0691 | −0.02285 |
| 0.14 | 0.0737 | −0.0241 |
| 0.16 | 0.0775 | −0.0251 |
| 0.18 | 0.0808 | −0.0260 |
| 0.20 | 0.0838 | −0.0266 |
| 0.225 | 0.0867 | −0.0273 |
| 0.255 | 0.0892 | −0.0280 |
| 0.29 | 0.0909 | −0.0285 |
| 0.33 | 0.0914 | −0.0289 |
| 0.37 | 0.0905 | −0.0290 |
| 0.41 | 0.0887 | −0.0285 |
| 0.45 | 0.0856 | −0.0275 |
| 0.49 | 0.0816 | −0.0260 |
| 0.53 | 0.0767 | −0.0240 |
| 0.57 | 0.0710 | −0.0220 |
| 0.61 | 0.0646 | −0.0199 |
| 0.65 | 0.0580 | −0.0179 |
| 0.69 | 0.0514 | −0.0158 |
| 0.73 | 0.0447 | −0.0138 |
| 0.77 | 0.0381 | −0.0117 |
| 0.81 | 0.0315 | −0.0097 |
| 0.845 | 0.0257 | −0.00791 |
| 0.88 | 0.0199 | −0.00613 |
| 0.91 | 0.0149 | −0.00459 |
| 0.935 | 0.01078 | −0.00332 |
| 0.955 | 0.00745 | −0.00230 |
| 0.98 | 0.00331 | −0.00102 |
| 1.0 | 0.0000 | 0.0000 | wherein X defines a station along said constant chord C with respect to the leading edge of said inboard segment, $Y_u$ defines a vertical distance to the upper airfoil surface of said inboard segment with respect to said constant chord C at said station Y, and $Y_1$ defines a vertical distance to the lower airfoil surface of said inboard segment with respect to said constant chord C at said station X.

4. The quiet tail rotor blade of claim 1 wherein said predetermined airfoil section profile of said swept, tapered tip segment is defined by values of X/C, $Y_{u/C}$, and Yl/C as follows:

| X/C | $Y_u/C$ | $Y_l/C$ |
|---|---|---|
| 0.0000000 | 0.0000000 | 0.0000000 |
| 0.0001990 | 0.0020004 | −0.0014536 |
| 0.0007980 | 0.0039456 | −0.0028691 |
| 0.0019940 | 0.0064817 | −0.0045726 |
| 0.0029910 | 0.0080286 | −0.0054464 |
| 0.0044866 | 0.0098685 | −0.0064445 |
| 0.0069791 | 0.0123915 | −0.0077026 |
| 0.0099701 | 0.0149206 | −0.0088773 |
| 0.0159522 | 0.0190758 | −0.0107041 |
| 0.0219343 | 0.0224997 | −0.0121748 |
| 0.0279164 | 0.0254451 | −0.0134469 |
| 0.0338935 | 0.0280394 | −0.0145875 |
| 0.0398806 | 0.0303688 | −0.0156308 |
| 0.0458627 | 0.0324936 | −0.0165939 |
| 0.0518448 | 0.0344488 | −0.0174868 |
| 0.0578269 | 0.0362486 | −0.0183144 |
| 0.0677969 | 0.0389031 | −0.0195684 |

-continued

| X/C | $Y_u/C$ | $Y_l/C$ |
| --- | --- | --- |
| 0.0777671 | 0.0411432 | −0.0206910 |
| 0.0877373 | 0.0430162 | −0.0217062 |
| 0.0977075 | 0.0445832 | −0.0226382 |
| 0.1126626 | 0.0465043 | −0.0239102 |
| 0.1276179 | 0.0480542 | −0.0250639 |
| 0.1425731 | 0.0493453 | −0.0261243 |
| 0.1575294 | 0.0504438 | −0.0271044 |
| 0.1724845 | 0.0513848 | −0.0280133 |
| 0.1874397 | 0.0521844 | −0.0288530 |
| 0.2023950 | 0.0528595 | −0.0296285 |
| 0.2173502 | 0.0534273 | −0.0303387 |
| 0.2323054 | 0.0539109 | −0.0309878 |
| 0.2472606 | 0.0543222 | −0.0315787 |
| 0.2771711 | 0.0549582 | −0.0325939 |
| 0.3070815 | 0.0553685 | −0.0334015 |
| 0.3369920 | 0.0555642 | −0.0340074 |
| 0.3768725 | 0.0554939 | −0.0345060 |
| 0.4167542 | 0.0550395 | −0.0346375 |
| 0.4366944 | 0.0546633 | −0.0345582 |
| 0.4566347 | 0.0541818 | −0.0343756 |
| 0.4765750 | 0.0535949 | −0.0340867 |
| 0.4965153 | 0.0528987 | −0.0336834 |
| 0.5164557 | 0.0520931 | −0.0331648 |
| 0.5363959 | 0.0511762 | −0.0325317 |
| 0.5563362 | 0.0501489 | −0.0317904 |
| 0.5762765 | 0.0490093 | −0.0309487 |
| 0.5962168 | 0.0477553 | −0.0300177 |
| 0.6161571 | 0.0463809 | −0.0290025 |
| 0.6360974 | 0.0448751 | −0.0279040 |
| 0.6560386 | 0.0432198 | −0.0267202 |
| 0.6759790 | 0.0413910 | −0.0254481 |
| 0.6959193 | 0.0393675 | −0.0240878 |
| 0.7158596 | 0.0371404 | −0.0226422 |
| 0.7357998 | 0.0347187 | −0.0211213 |
| 0.7557402 | 0.0321385 | −0.0195403 |
| 0.7756805 | 0.0294449 | −0.0179181 |
| 0.7956207 | 0.0266811 | −0.0162719 |
| 0.8155611 | 0.0238711 | −0.0146166 |
| 0.8355014 | 0.0210120 | −0.0129573 |
| 0.8554416 | 0.0180887 | −0.0112890 |
| 0.8753819 | 0.0150931 | −0.0095976 |
| 0.8953232 | 0.0120514 | −0.0078631 |
| 0.9152635 | 0.0090458 | −0.0060814 |

-continued

| X/C | $Y_u/C$ | $Y_l/C$ |
| --- | --- | --- |
| 0.9352039 | 0.0062289 | −0.0042897 |
| 0.9551441 | 0.0038493 | −0.0026103 |
| 0.9600000 | 0.0033756 | −0.0022631 |
| 0.9633512 | 0.0030800 | −0.0020583 |
| 0.969000 | 0.0026478 | −0.0017742 |
| 0.9750842 | 0.0022883 | −0.0015480 |
| 0.9800690 | 0.0022035 | −0.0014189 |
| 0.9850545 | 0.0022152 | −0.0013367 |
| 1.0000000 | 0.0024077 | −0.0011590 | where X defines a station along said variable chord C with respect to the leading edge of said swept, tapered tip segment, $Y_u$ defines a vertical distance to the upper airfoil surface of said swept, tapered tip segment with respect to said variable chord C at said station X, and $Y_l$ defines a vertical distance to the lower airfoil surface of said swept, tapered tip segment with respect to said variable chord C at said station X.

5. The quiet tail rotor of claim 1 wherein said quiet tail rotor has a predetermined span, and further wherein said swept, tapered tip segment being at a predetermined station within the range of about 0.88 to about 0.92 of said predetermined span.

6. The quiet tail rotor of claim 5 wherein said predetermined station is about 0.90 of said predetermined span.

7. The quiet tail rotor of claim 1 wherein said inboard segment includes an airfoil transition span between said predetermined constant airfoil section profile of said inboard segment and said predetermined airfoil section profile of said swept, tapered tip segment.

8. The quiet tail rotor of claim 1 wherein said swept, tapered tip segment further includes a first arcuate portion, a second arcuate portion, and a tip chord, said first arcuate portion smoothly joining the leading edge of said inboard segment with said rearwardly swept, straight leading edge, and wherein said second arcuate portion smoothly joins said rearwardly swept, straight leading edge with said tip chord.

* * * * *

UNITED STATES PATENT AND TRADEMARK OFFICE
CERTIFICATE OF CORRECTION

PATENT NO. : 5,137,427

DATED : August 11, 1992

INVENTOR(S) : RAJARAMA K. SHENOY ET AL

It is certified that error appears in the above-identified patent and that said Letters Patent is hereby corrected as shown below:

Title page, item (75) Inventor: Please add Robert C. Moffitt;

Col. 1, line 2, add the following paragraph:

--The invention described herein was made in the performance of work under NASA Contract and is subject to the provisions of Section 305 of the National Aeronautics and Space Act of 1958 (72 Stat. 435; 42 U.S.C. 2457).--

Signed and Sealed this

Seventh Day of September, 1993

*Attest:*

*Attesting Officer*

BRUCE LEHMAN

*Commissioner of Patents and Trademarks*